United States Patent
Sitaraman et al.

(10) Patent No.: US 6,263,369 B1
(45) Date of Patent: Jul. 17, 2001

(54) DISTRIBUTED ARCHITECTURE ALLOWING LOCAL USER AUTHENTICATION AND AUTHORIZATION

(75) Inventors: Aravind Sitaraman, Santa Clara; Houshang Nayeb Hosseini, Redwood Shores; Jie Chu, Los Altos; Leslie Alan Thomas, San Francisco; Shujin Zhang, San Mateo, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/183,785

(22) Filed: Oct. 30, 1998

(51) Int. Cl.[7] .................................................. G06F 15/173
(52) U.S. Cl. ........................ 709/225; 709/201; 709/217; 709/219
(58) Field of Search ................................... 709/201, 217, 709/219, 225

(56) References Cited

U.S. PATENT DOCUMENTS

| | | | |
|---|---|---|---|
| 4,763,191 | 8/1988 | Gordon et al. | 358/86 |
| 4,922,486 | 5/1990 | Lidinsky et al. | 370/60 |
| 4,962,497 | 10/1990 | Ferenc et al. | 370/60.1 |
| 5,003,595 | 3/1991 | Collins et al. | 380/25 |
| 5,241,594 | 8/1993 | Kung | 380/4 |
| 5,241,599 | 8/1993 | Bellovin et al. | 380/21 |
| 5,416,842 | 5/1995 | Aziz | 380/30 |
| 5,423,002 | 6/1995 | Hart | 395/200 |
| 5,621,721 | 4/1997 | Vatuone | 370/16 |
| 5,655,077 | 8/1997 | Jones et al. | 395/187.01 |
| 5,668,857 | 9/1997 | McHale | 379/93.07 |
| 5,671,354 | 9/1997 | Ito et al. | 395/187 |

(List continued on next page.)

FOREIGN PATENT DOCUMENTS

| | | | |
|---|---|---|---|
| 0 567 217 | 10/1993 | (EP) | H04L/12/46 |
| 99/53408 | * 10/1999 | (WO) | . |
| WO 99/53408 | 10/1999 | (WO) | G06F/17/16 |

OTHER PUBLICATIONS

Bellovin, Steven M., "Problem Areas for the IP Security Protocols", Jul. 22–25, 1996, Proceedings of the Sixth Usenix UNIX Security Symposium, San Jose, CA.

Active Software, Inc., "Active Software's Integration System", printed from http://www.activesw.com/products/products.html, on Jul. 24, 1998.

Ascend Communications, Inc., "Access Control Product Information", 4 pages.

(List continued on next page.)

*Primary Examiner*—Saleh Najjar
(74) *Attorney, Agent, or Firm*—Thelen Reid & Priest LLP; David B. Ritchie

(57) ABSTRACT

A network access point for locally processing an access request is configured to include an information bus, an access event publisher, and at least one local cache having at least one user record. The access event publisher publishes at least one network access event on the information bus during the processing of the access request. The first local cache is coupled to and is responsive to the network access event by updating the user record according to information contained by the network access event if the information includes a home access point ID that corresponds to the first local cache. The network access point may be part of a communications system having a mother cache. The mother cache is coupled to the first local cache and includes user records of subscribers supported by the communications system. The first local cache obtains a user record associated with one of the subscribers from the mother cache, if the user record is not stored in the first local cache, in response to a log-on attempt to the network access point by the subscriber.

40 Claims, 3 Drawing Sheets

U.S. PATENT DOCUMENTS

| | | | |
|---|---|---|---|
| 5,684,950 | 11/1997 | Dare et al. | 395/187.01 |
| 5,708,780 | 1/1998 | Levergood et al. | 395/200.12 |
| 5,809,422 | 9/1998 | Raleigh et al. | 455/449 |
| 5,815,665 | 9/1998 | Teper et al. | 395/200 |
| 5,835,727 | 11/1998 | Wong et al. | 395/200.68 |
| 5,845,070 | 12/1998 | Ikudome | 395/187.01 |
| 5,898,780 | 4/1999 | Liu et al. | 380/25 |
| 5,933,625 * | 8/1999 | Sugiyama | 709/200 |
| 5,944,824 | 8/1999 | He | 713/201 |
| 5,987,232 * | 11/1999 | Tabuki | 395/187.01 |
| 5,991,810 * | 11/1999 | Shapiro et al. | 709/229 |
| 6,006,334 * | 12/1999 | Nguyen et al. | 713/202 |
| 6,011,910 * | 1/2000 | Chau et al. | 395/200.59 |
| 6,021,496 * | 2/2000 | Dutcher et al. | 713/202 |
| 6,047,376 * | 4/2000 | Hosoe | 713/201 |
| 6,092,196 * | 7/2000 | Reiche et al. | 713/200 |
| 6,141,687 | 10/2000 | Blair | 709/225 |

OTHER PUBLICATIONS

Ascend Communications, Inc., "Remote Access Network Security", printed from http://www.ascend.com/1103.html, on Jul. 24, 1998, pp. 1–8.

Ascend Communications, Inc., "MultiVPN from Ascend Communications: Breaking Down the Barriers to VPNs", White Paper, 1998.

Bracho, Dr. Rafael, "Mastering Corporate Computing with the ActiveWeb System", 1996, Active Software, Inc.

Rigney, et al., "Remote Authentication Dial In User Service (RADIUS)", Network Working Group, RFC 2138, Apr. 1997, pp. 1–57.

* cited by examiner

US 6,263,369 B1

DISTRIBUTED ARCHITECTURE ALLOWING LOCAL USER AUTHENTICATION AND AUTHORIZATION

BACKGROUND OF THE INVENTION

1. Field of the Invention

The present invention relates to providing network access to a communications system. More particularly, the present invention relates to providing network access to a communications system by locally authenticating and authorizing access requests.

2. The Background

Turning to FIG. 1, one approach for providing network access to a communications system 8 over an access point (such as access point 10a, access point 10b, or access point 10c) using a communications network 12 is shown. An access point is associated with a set of service components and at least one client, enabling a subscriber 14 using a host machine 16, such as a personal computer having a modem, to obtain access to system 8. As known to those of ordinary skill in the art, when referred to in the context of the Internet or other large computer networks, each client coupled to an access point provides connectivity to hosts within an area commonly referred to as a PoP or "Point of Presence." A PoP is a geographical area that is serviced by an access point, which is typically managed by an ISP ("Internet Services Provider"). For dial-up access methods using a public switched telephone network (PSTN), the geographical area may be defined by an area code.

For example, if network 12 is implemented using the Internet, access point 10a may be configured to support subscribers within a geographical area defined by a first area code, such as that covering San Jose, Calif., while access point 10b may be configured to support subscribers within another geographical area defined by a second area code, such as that covering San Francisco, Calif. and/or its surrounding cities and towns. Similarly, access point 10c may be configured to support subscribers within a geographical area defined by a third area code, such as that covering New York City, N.Y.

For dial-up access to network 12, each access point includes a network access server (commonly referred to as a NAS), such as network access server 18. Network access server 18 functions as an interface between host machine 16 (via the modem) and the necessary services which must be provided when subscriber 14 seeks to obtain network access using a dial access method. Responding to a dial-up access request typically includes the process steps (sometimes referred to as "states") of authentication, authorization, and accounting. These states may be provided by an AAA server, such as AAA server 20. AAA server 20 uses the RADIUS protocol to communicate with devices, such as network access server 18, which request authentication, authorization, and accounting services.

To provide authentication, authorization, and accounting services properly, AAA server requires access to a database 21 having a set of user records. For a communications system that has more than one access point, such as communications system 8, database 21 may be maintained as a central database that contains all of the user records required by all of the access points in communications system 8. This provides the advantages of maintaining only one database for more than one access point, reducing the complexity of the system, while permitting a subscriber to obtain network access at an access point other than his originating access point (commonly referred to as "roaming").

For example, if access point 10a is the home access point for subscriber 14, subscriber 14 may still dial-up a different access point, even if the access point is at a different geographical area, such as access point 10c. This is possible because access point 10c has access to the user record corresponding to subscriber 14 by virtue of database 21.

However, centrally locating a database is expensive with respect to network bandwidth consumption because each database transaction generated for every access request that requires AAA services from an access point in communications system 8 must be sent to database 21 (sometimes referred to as "back-hauling"). Moreover, this problem of bandwidth consumption increases and becomes more acute during peak use hours.

One solution includes implementing a local database at each access point. However, this solution offers the challenges of having to maintain synchronicity with other local databases, such as for the purposes of offering roaming as a service.

Accordingly, a need exists for a network access point that can be configured to have at least one local database or cache that holds user records which may be used for authentication, authorization, and accounting purposes.

Further, a need exists for a network access point that can be configured to have at least one local database or cache which can be easily synchronized with other local databases or caches within the access point or within other access points.

Furthermore, a need exists for a communications system having network access points that can be configured to have at least one local database or cache which can be easily synchronized with a central database or cache without consuming network bandwidth used for transporting subscriber data.

BRIEF DESCRIPTION OF THE INVENTION

In a first aspect of the present invention, a network access point for locally processing an access request is configured to include an information bus, an access event publisher, and at least one local cache having at least one user record. The access event publisher publishes at least one network access event on the information bus during the processing of the access request. The first local cache is coupled to and is responsive to the network access event by updating the user record according to information contained by the network access event if the information includes a home access point ID that corresponds to the first local cache.

In a second aspect of the present invention, the network access point is part of a communications system having a mother cache. The mother cache is coupled to the first local cache and contains user records of subscribers supported by the communications system. The first local cache obtains a user record associated with one of the subscribers from the mother cache, if the user record is not stored in the first local cache, in response to a log-on attempt to the network access point by the subscriber.

DETAILED DESCRIPTION OF A PREFERRED EMBODIMENT

In the following description, a presently preferred embodiment of the invention is described with regard to preferred process steps and data structures. However, those skilled in the art would recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using C++ programs running on an Enterprise 2000 server™ running SunSolaris™ as its operating system. The Enterprise 2000 server™ and SunSolaris™ operating system are available from Sun MicroSystems, Inc. of Mountain View, Calif. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA or ASIC technology, and the like, may also be used without departing from the scope and spirit of the inventive concepts disclosed herewith.

Figure 1:
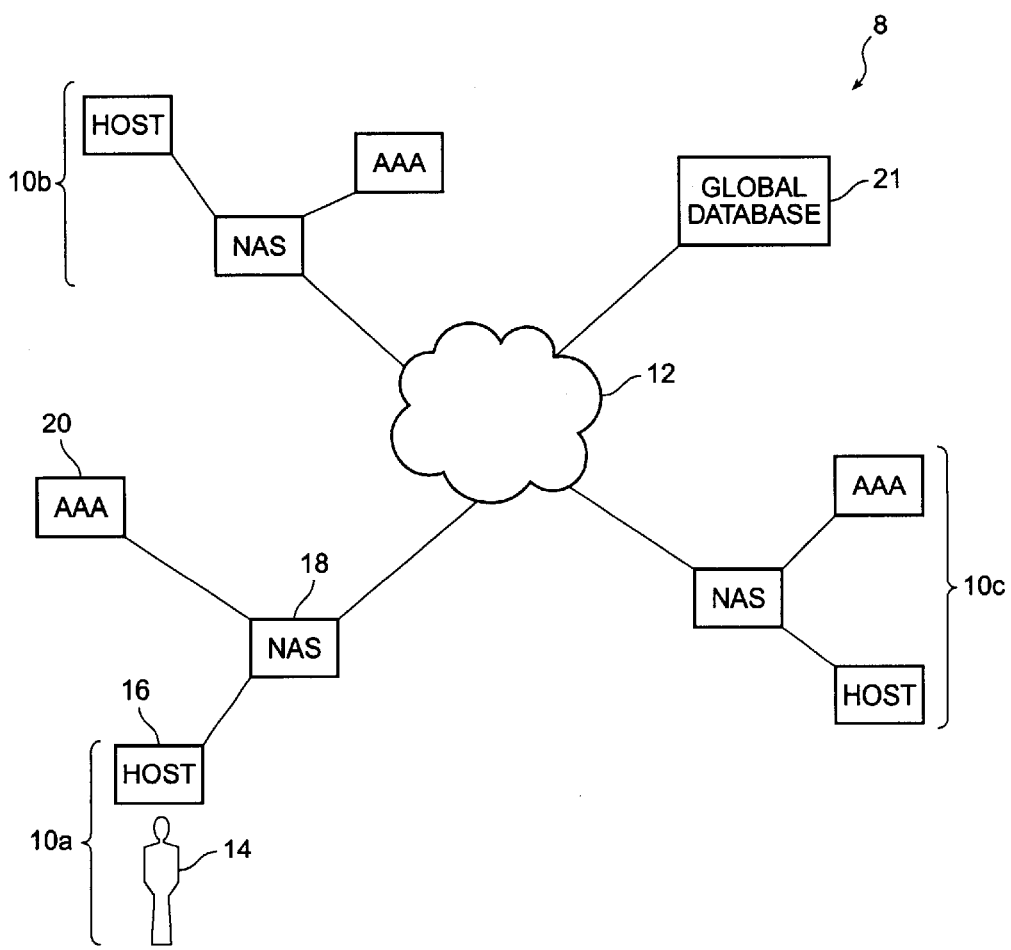
FIG. 1 is a schematic diagram of a one type of a communications system having a central database for supporting access requests processed by more than one access point.
Figure 2:
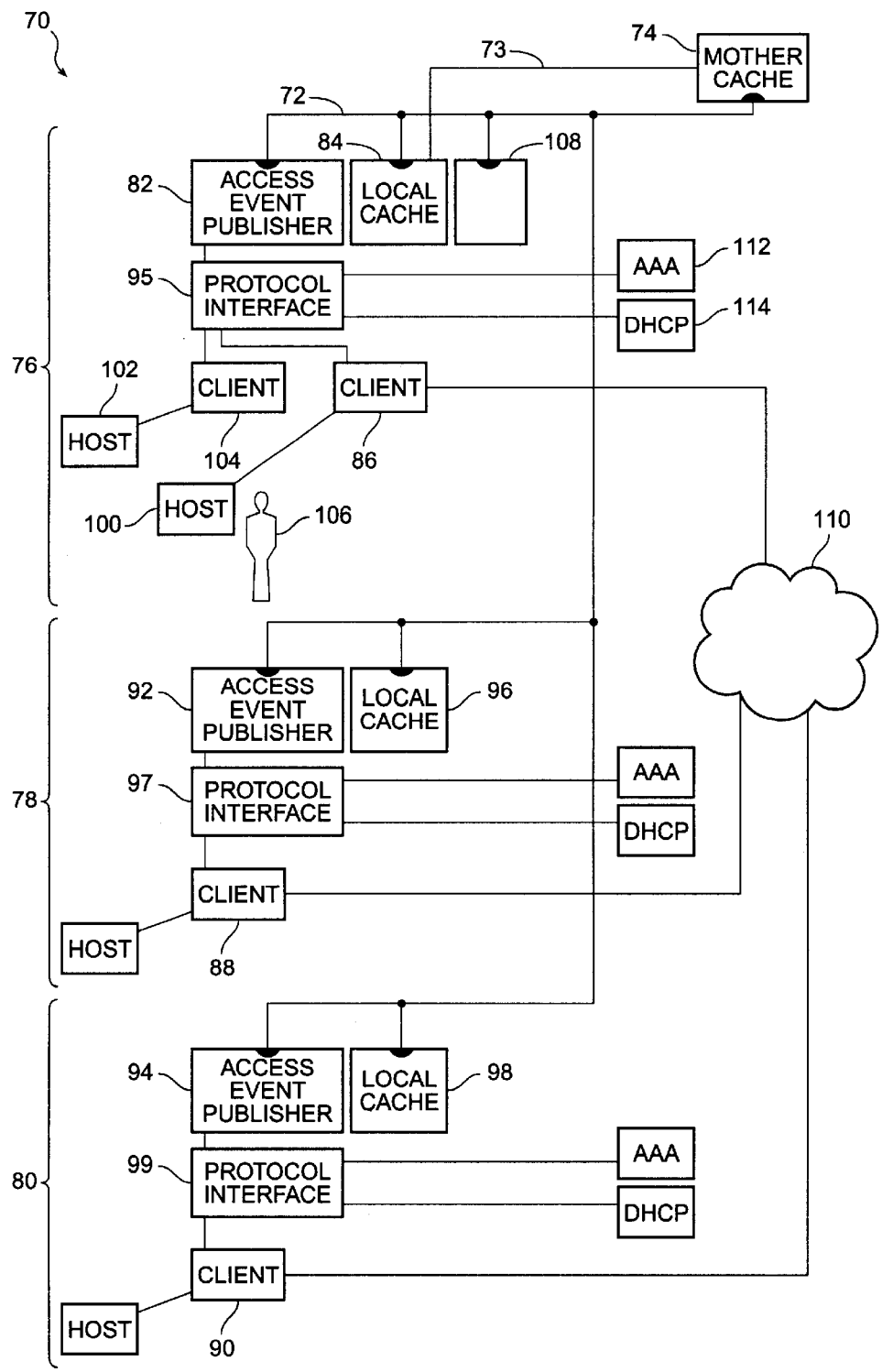
FIG. 2 is a schematic diagram of a communications system having an information bus and a distributed local cache architecture for supporting local processing of access requests in accordance with a presently preferred embodiment of the present invention.

FIG. 2 is a schematic diagram of a communications system having an information bus and a distributed local cache architecture for supporting local processing of access requests in accordance with a presently preferred embodiment of the present invention.

Communications system 70 is shown having at least one access point and an information bus 72 to which a mother cache 74 is coupled. The number of access points used in communications system 70 is not intended to be limiting in any way. Those of ordinary skill in the art will readily recognize that more or less than the number of access points shown may be implemented without departing from the scope and spirit of the herein disclosure. For example, as shown in FIG. 2, communications system 70 may include access point 76, access point 78, and access point 80.

Information bus 72 is a communications medium along which information may be transmitted and/or received among components coupled to the communications medium, such as access event publisher 82 and local cache 84. The communications medium used may be a LAN, WAN, or any equivalent communications network. In accordance with a presently preferred embodiment of the present invention, information is transmitted as an event on the bus by components acting as publishers, while information is received from the bus by components which have subscribed to the event. This approach enables each component to communicate with other components since each may act as a publisher, subscriber, or both. A component configured to publish events may thus transmit information on bus 72, such as access event publisher 82, while a component configured to subscribe to events may receive information on bus 72. Information bus 72 may be implemented using the "Active Web™" product from Active Software of Santa Clara, Calif.

Those of ordinary skill in the art will readily recognize that using the above publisher/subscriber approach to synchronize local caches with each other and/or with the mother cache provides an easily scalable system. Local caches may be added or removed from the system without having to configure the other local caches or the mother cache to be aware of the change.

Communications system 70 is shown having access points 76, 78, and 80. Each access point shown in FIG. 2 is associated with a client, an access event publisher, at least one local cache, and a protocol interface. For example, access point 76, access point 78, and access point 80 are each associated with a client 86, a client 88, and a client 90, respectively; an access event publisher 82, an access event publisher 92, and an access event publisher 94, respectively; a local cache 84, a local cache 96, and a local cache 98, respectively; and a protocol interface 95, a protocol interface 97, and a protocol interface 99, respectively.

A client is an interface configured to be responsive to a host machine that uses a particular type of access method. For example, client 86 may be implemented using a network access server, which is commonly referred to as a NAS, enabling access point 76 to receive a network access request from a host that uses a dial-up access method, such as host 100.

The type and number of clients associated with each access point is not intended in any way to be limiting. Those of ordinary skill in the art will readily recognize that additional clients may be supported, such as an ADSL interface, or an equivalent access interface. For example, access point 76 may be configured to support a host 102 that uses an ADSL modem to obtain network access. Hence, access point 76 may be associated with a client 104 that is responsive to access requests from an ADSL modem. Client 86 may be implemented, for example, using the Cisco 5100 product, while client 104 may be implemented, for example, using the Cisco 6100 product, both of which are available from Cisco Systems, Inc. of San Jose, Calif.

A local cache may be implemented as an in-memory database using the Berkeley DB product, available from Sleepy Cat Software, Inc., of Carlisle, Mass. The use of an in-memory database is not intended to be limiting. Other types of equivalent data stores or databases may be used as long as user records may be properly retrieved when required. In accordance with a presently preferred embodiment of the present invention, only the user records of subscribers who have been selected to belong to a particular access point are stored in the local cache within the access point. This results in every subscriber having a "home" access point. For example, a subscriber 106, who has been selected to have access point 76 as its home access point, will have its user record stored within local cache 84.

The number of local caches per access point shown in FIG. 2 is not intended to be limiting in any way. Each access point is associated with at least one local cache for storing user records although additional local caches may be supported depending on the amount of user records for storage, reading and writing latency, or the like. For example, access point 76 may include a second local cache 108 which is shown in FIG. 2.

The criteria for selecting which access point a subscriber will have as the subscriber's home access point may be based on the expected location of the subscriber. This location may be determined using, for example, the subscriber's billing address although other criteria may be used in lieu of or in addition to the billing address of the subscriber.

Each local cache used by an access point is coupled to information bus 72 and is subscribed to selected events that are transmitted on information bus 72. In accordance with a presently preferred embodiment of the present invention, each local cache is subscribed to a network access event. However, each local cache only accepts network access events that have an access point identifier ("ID") that corresponds to the access point having the local cache, i.e., network access events are filtered according to an access point ID. This enables each local cache to use the information published in a network access event to update the user records of its own subscribers although the local caches may be distributed throughout communications system 70 on information bus 72. Moreover, since information bus 72 is on a communications medium separate from the communications medium used to transmit data transferred between access points, such as backbone 110, bandwidth allocated for transmitting data to and from access points on the network is not consumed or transmission latency increased. In accordance with a presently preferred embodiment of the present invention, backbone 110 may be implemented using any wide area network, such as the Internet.

The above approach will also enable the synchronization of local caches associated with the same access point, such as local caches 84 and 108 of access point 76. Because local caches 84 and 108 are associated with the same access point, they will share the same access point ID, enabling them to accept the same network access events. Consequently, an ISP may configure one of the local caches as a secondary cache for fault tolerance or other purposes requiring the use of a mirrored local cache or equivalent memory store.

Each local cache communicates with mother cache 74 through a communications medium 73 using UDP ("User Datagram Protocol"). UDP is a connectionless protocol well known to those of ordinary skill in the art. Communications medium 73 is separate from information bus 72 and is any medium suitable for supporting the UDP protocol. As shown in FIG. 2, communications medium 73 is coupled to mother cache 74 with local cache 84. Local caches 96 and 98 also are coupled to mother cache 74 via separate communications mediums which are not shown in FIG. 2 to avoid overcomplicating the herein disclosure. By communicating with mother cache 74 via UDP, each local cache may obtain a user record which is not found within its memory store, such as when a subscriber is seeking network access via an access point which is not the subscriber's home access point. This is commonly referred to as "roaming."

In accordance with a presently preferred embodiment of the present invention, mother cache 74 holds user records for each subscriber supported by communications system 70. Mother cache 74 communicates with components coupled to information bus 72 as a subscriber to network access events published by local caches. Unlike the local caches, mother cache 74 does not filter a network access event according to an access point ID, enabling mother cache 74 to receive and accept all network access events published on information bus 72. Mother cache 74 also: communicates with at least one local cache using UDP when servicing a request by the local cache to obtain a user record which is not available within the local cache; subscribes to cache transfer events; and publishes cache transfer events, which enables mother cache 74 to provide user records to a selected caches, such as during a restore operation. Cache transfer events will be further described below. Mother cache 74 may be implemented using the Berkeley DB™" product.

Network access events are published during the processing of an access request, such as during the allocation of an address by a DHCP server or equivalent service component. Because mother cache 74 subscribes to the network access events, it is able to maintain an up-to-date set of user records. Network access events are published using an access event publisher which collects information related to an event to be published and then publishes the event using information bus 72. An access event publisher is associated with each access point having a local cache and is coupled to information bus 72. Each event publisher publishes a network event in response to the completion of a selected step that is performed during the servicing of an access request.

In accordance with a presently preferred embodiment of the present invention, there are three types of network access events published by an access event publisher. The first event may be referred to as an address allocated event that is triggered each time an address is allocated in response to an access request. For example, as shown in FIG. 2, client 86 supports host 100 that is configured to obtain network access using a dial-up access method. As known in the art, the dial-up access method requires procuring a network address in response to an access request which has been properly authenticated and authorized by an AAA server, such as AAA server 112. The network address may be procured dynamically using the services of at least one DHCP server, such as DHCP server 114, if the user requesting network access has been selected to receive a dynamically allocated address, such as an IP address. AAA servers and DHCP servers are known in the art and will not be discussed in detail other than that necessary to disclose the present invention.

Upon the receipt of the dynamically allocated address, an access event publisher, such as access event publisher 82, publishes an address allocated event that includes: the address allocated; an access point ID that corresponds to the access point where the access request was received, which in this case is access point 76; and a network location designation, such as a fully qualified domain name address, that corresponds to a user which had initiated the access request, such as user 106.

An accounting start event is published by access event publisher 82 only if, after allocating an address to host 100, host 100 returns an accounting start signal (commonly referred to as an accounting start packet) to client 86. Each accounting start event includes a network location designation of the user who initiated the access request, which in this example, is the fully qualified domain name of user 106.

Similarly, an accounting stop event is published by publisher 82 only if host returns an accounting stop signal (commonly referred to as an accounting stop packet) to client 86. Each accounting stop event includes a network location designation of the user who initiated the access request, which in this example, is the fully qualified domain name of user 106.

The above network access events enable subscribers of the events to receive information that may be relevant to the user records held by the subscribers. There are two types of subscribers, which subscribe to network access events—local caches and mother cache 74. As described above, each local cache accepts only network access events that contain an access point ID that corresponds to its access point. This enables a local cache to receive only events that correspond to the user records stored within the local cache. Mother cache 74, as described above, subscribes to each network access event. Unlike the local caches, mother cache 74 does not selectively receive the events because it holds the user records for every user processed as a subscriber to communications system 70. Hence, in order to maintain an up-to-date user record for each subscriber supported by each of the access points in communications system 70, mother cache 74 must receive all network access events published on information bus 72 regardless of which access event publisher transmitted the event.

Since mother cache 74 maintains an up-to-date and complete set of user records, it is well positioned to provide a user record to an access point which requires a user record for a subscriber seeking access through the access point but for whom the access point does not keep a user record in its corresponding local cache. This situation occurs when a subscriber attempts to obtain network access through an access point which is not the subscriber's home access point, i.e., the subscriber is "roaming". In this situation, the access point will need to obtain the subscriber's user records before attempting to authenticate, authorize, provide an address if authorized, and if necessary, account for the user.

In accordance with a presently preferred embodiment of the present invention, mother cache 74 transmits information to the access points upon request, such as when a subscriber seeks network access through an access point which is not the subscriber's home access point. The request for user record information is sent from a local cache to mother cache 74 through communication bus 73 using UDP. Configuring devices to communicate with each other using UDP is well known to those of ordinary skill in the art and thus will not be further disclosed to avoid overcomplicating the disclosure.

In an alternative embodiment of the presently preferred embodiment of the present invention, a user record may be obtained by a local cache from the mother cache using information bus 72 through the publisher/subscriber method. This alternative embodiment includes subscribing mother cache 74 to cache update events and configuring a local cache to publish cache update events and receive cache update events. The local cache rejects cache update events that were sent by another local cache or that include an access point ID that does not correspond to the access point ID associated with the local cache.

A cache update event is an event that contains the fully qualified name of a subscriber and the access ID of the access point corresponding to the local cache that published the cache update event. Upon receipt of the cache update event, mother cache 74 retrieves the user record of the subscriber from a storage area using the fully qualified subscriber name. Mother cache 74 then transmits the user record, along with the access ID contained in the cache update request, by publishing them on information bus 72 as a cache transfer event. Because the local cache subscribes to cache transfer events but filters out all cache transfer events that do not have an access point ID which corresponds to the access point in which the local cache belongs, the local cache which requested the cache update event will be assured to receive the user record requested via a cache transfer event published by mother cache 74. This enables the local cache responding to an access request from a roaming subscriber to obtain a user record from mother cache 74.

In accordance with a presently preferred embodiment of the present invention, the publisher/subscriber approach may also be used to synchronize user records in memory cache 74 with user records from one or more local caches. For example, synchronization may be required when a new access point is added to communications system 70, when communications system 70 is being initialized to receive user records exported from another communications system, or when an existing access point has a local cache that needs to be restored. Preferably, each local cache can be synchronized with mother cache 74. This includes subscribing each local cache to only those cache transfer events that have an access point ID that corresponds to the access point in which the local cache is associated. Mother cache 74 publishes user records as cache transfer events and includes an access point ID in each published cache transfer event.

A protocol interface allows access requests received from a client to be serviced using components that may communicate using different protocols, such as AAA server and DHCP server. As shown in FIG. 2, a protocol interface, such as protocol interface 95, used by an access point is coupled to at least one client, an access event publisher, a AAA server, and a DHCP server, such as client 86, access event publisher 82, AAA server 112, and DHCP server 114, respectively. Protocol interface 95 receives a network access request from client 86 and determines the proper access methodology required to properly process the network access request. For example, if the client relies on a dial-up access methodology, such as client 86, then the protocol interface processes the network access request according to the dial-up access methodology. This includes sending a request for authentication and authorization to AAA server 12 and if authorized, sending an IP address request to DHCP server 114. Upon receipt of the IP address, protocol interface 95 forwards the IP address to client 86 which, in turn, forwards it to host 100. Receiving an IP address enables host 100 to request a log-on session by, among other things, sending the IP address to client 86 which, in turn forwards the IP address to protocol interface 95.

The user access event publisher, local cache, and protocol interface may be implemented, for example, using the User Control Point product, available from Cisco Systems, Inc. The use of the User Control Point product is not intended to be limiting in any way. Other implementations may be used so long as they include the functionality described herein.

Figure 3:
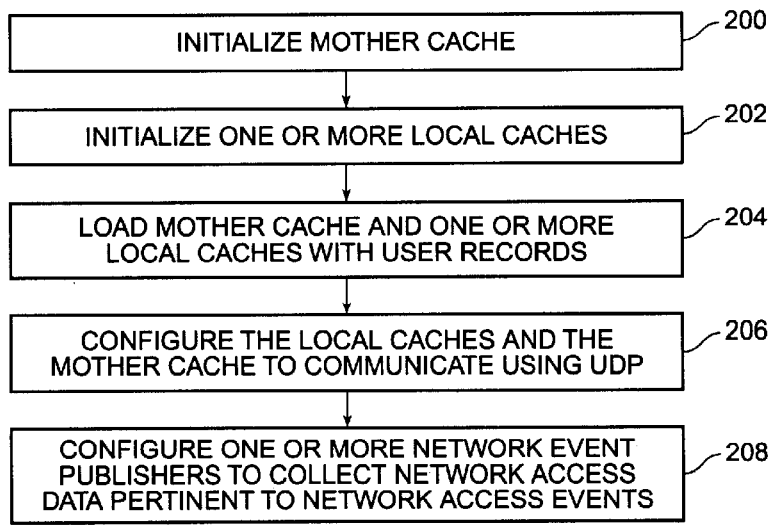
FIG. 3 is a flow chart of a process for initializing components that support local processing of access requests in accordance with a presently preferred embodiment of the present invention.

FIG. 3 is a flow chart of the process for initializing components that support local processing of access requests in accordance with a presently preferred embodiment of the present invention.

At reference number 200, a mother cache is initialized, such as mother cache 74 (see also FIG. 2). This includes coupling mother cache 74 to information bus 72 and configuring mother cache 74 to publish cache transfer events and to subscribe to network access events.

At reference number 202, one or more local caches are initialized. The number of caches initialized are not intended to be limiting in any way although preferably every local cache used by an access point selected for use in a communications system should be initialized when the system is first brought on-line.

The one or more local caches are also subscribed to any network access event published on information bus 72 that includes an access point ID that corresponds to the access point in which each local cache belongs. In accordance with a presently preferred embodiment of the present invention, this step is performed using a local cache having the functional features described above, such as local cache 84. Preferably, all of the local caches employed by all of the access points in communications system 70 are so configured.

At reference number 204, mother cache 74 and the one or more local caches are loaded with user records. In accordance with a presently preferred embodiment of the present invention, the user records are appropriately loaded by publishing one cache transfer event on information bus 72 for each user record that corresponds to a user that is to be supported. Mother cache 74 receives and accepts each published user record because mother cache 74 has been subscribed to cache transfer events and accepts each of the events. The one or more local caches also have been subscribed to cache transfer events but receive only cache transfer events that include an access point ID that corresponds to the access point to which each of the respective local caches belong. Hence, the one or more the local caches also receive user records but only accept user records that correspond to users corresponding to the access point associated with a local cache.

The cache transfer events used to load the local cache(s) and mother cache 74 may be published by a data store adapter (not shown) which is a publisher on information bus 72 and publishes each user record as a cache transfer event on the bus. The data store adapter may be coupled to an existing database of records, enabling the existing records to be dispersed to each subscribing local cache and mother cache 74.

In the case one or a selected number of local caches may need to be restored, such as when a local cache fails or needs to be brought on-line, initialization may be so limited to that local cache. In accordance with a presently preferred embodiment of the present invention, this step is performed using mother cache 74 to publish on information bus 72 a cache transfer event having user records that have been selected to be loaded onto a local cache associated with an access point that corresponds to an access point ID contained with the cache transfer event.

At reference number 206, the local caches and mother cache 74 are initialize to communicate using UDP, so that any one of the local caches to obtain from mother cache 74 a user record which was not transferred via a local cache transfer event. This permits a subscriber to roam within communications system 70 without forfeiting any access rights that would have been available if the subscriber had accessed communications system 70 through the subscriber's home access point.

In accordance with an alternative embodiment of the present invention, instead of using UDP to transfer user records between mother cache 74 and any of the local caches, one or more of the local caches may instead publish cache update events on information bus 72. In addition, mother cache 74 receives the cache update events published on information bus 72 as a subscriber. As disclosed above, a cache update event includes a subscriber name, such as a fully qualified domain name, and an access point ID corresponding to the access point in which the publishing local cache belongs. Upon receiving the cache update event, mother cache 74 obtains a user record using the subscriber name contained in the received cache update event and publishes a cache transfer event containing the user record and the access point ID originally contained within the cache update event. This permits a local cache to request and obtain a user record from mother cache 74 if a roaming subscriber seeks network access using the access point in which the local cache corresponds.

At reference number 208, one or more access event publishers are configured to collect network access data pertinent to network access events, such as those described above for access event publisher 82. This permits access event publishers to publish network access events when appropriate.

Figure 4:
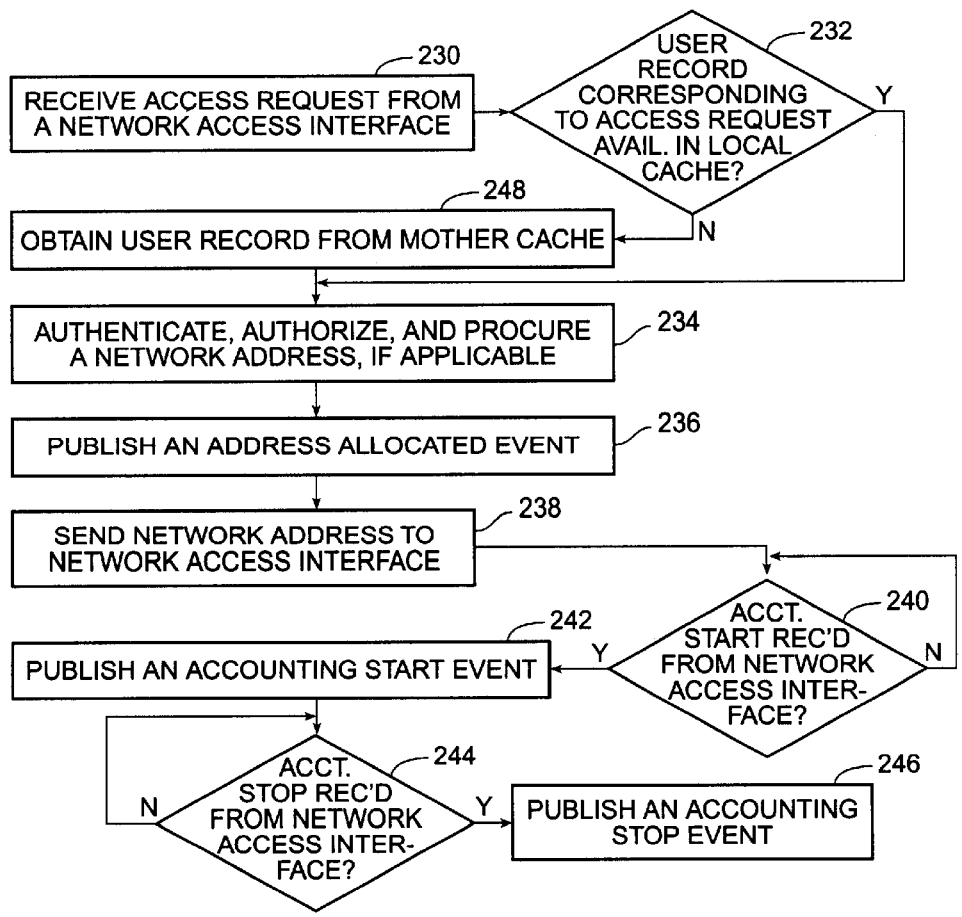
FIG. 4 is a flow chart of a process for supporting local processing of access requests in accordance with a presently preferred embodiment of the present invention.

FIG. 4 is a flow chart of the process for supporting local processing of access requests in accordance with a presently preferred embodiment of the present invention.

At reference number 230, an access request is received by an access point via a client, such as a network access server. For example, referring to FIG. 2, subscriber 106 may seek to obtain network access to communications system 70 using host 100 to initiate the access request. The access request is received by network access server and processed using the following steps.

At reference number 232, local cache, such as local cache 84 in FIG. 2, provides a user record tha corresponds, to the subscriber who initiated the access request. If a user record is found by local cache 84, then step 234 is performed.

At reference number 234, the access request is then authenticated and authorized, and if applicable, a network address, such as an IP address, is procured dynamically. As known to those of ordinary skill in the art, authentication and authorization services may be procured using the services of a AAA server, such as AAA server 112 in FIG. 2, while a dynamically allocated IP address may be procured from a DHCP server, such as DHCP server 114.

At reference number 236, an access event publisher corresponding to the access point at which the access request was received, publishes an address allocated event.

At reference number 238, the allocated address is received by the client from the DHCP server and then relayed to the requesting host, such as host 100. Upon receipt host 100 may then respond by transmitting an account start signal, such as an account start packet, to client 86.

At reference number 240, if client 86 receives the account start signal, step 242 is performed. Otherwise, client 86 keeps processing until an account stop signal is received.

At reference number 242, access event publisher 82 publishes an accounting start event.

At reference number 244, if client 86 receives an account stop signal, step 246 is performed. Otherwise, client 86 keeps processing until an account stop signal is received.

At reference number 246, access event publisher publishes an accounting stop event.

If at reference number 232, the user record corresponding to the subscriber, local cache 84 performs the acts at reference 248. At reference number 248, local cache 84 contacts a mother cache, such as mother cache 74 as shown in FIG. 2, and requests the user record. In accordance with a presently preferred embodiment and as described above, local cache 84 obtains the user record from mother cache 74 using UDP. UDP as a communication method is not intended to limit the present invention in any way. Other methods may be used such as the alternative embodiment of using the publisher/subscriber method described above. The acts at reference number 234 is then performed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for locally processing an access request, said apparatus associated with a protocol interface and at least one client, comprising:

an access event publisher; and a first local cache having a user record including a home access point ID corresponding to a home access point ID of said first local cache, wherein said access event publisher publishes at least one network access event when the protocol interface receives an access request from a client; and wherein said first local cache is responsive to said network access event by selectively receiving said at least one network access event based on a home access point ID contained therein and updating said user record according to information contained within said at least one network access event if said information includes a home access point ID that corresponds to a home access point ID of said first local cache.

2. The apparatus of claim 1, further including an information bus to which said first local cache and said access event publisher are coupled.

3. The apparatus of claim 1, wherein said at least one network access event includes an IP allocated event.

4. The apparatus of claim 3, wherein said IP allocated event includes a network address, a home access point ID, and a user name.

5. The apparatus of claim 4, wherein said network address is an IP address, said home access point ID is a home PoP ID, and said user name is a fully qualified domain name address.

6. The apparatus of claim 1, wherein said at least one network access event includes an accounting start event.

7. The apparatus of claim 6, wherein said accounting start event includes a user name.

8. The apparatus of claim 1, wherein said at least one network access event includes an accounting stop event.

9. The apparatus of claim 8, wherein said accounting stop event includes a user name.

10. The apparatus of claim 1, wherein said first local cache includes a mother cache communication interface.

11. The apparatus of claim 1, further including a second local cache responsive to said at least one network access event by updating said user record according to said information, if said information includes a home access point ID that corresponds to a home access point ID of said second local cache.

12. The apparatus of claim 11, wherein said second local cache includes a mother cache communication interface.

13. The apparatus of claim 1, wherein said client includes a network access server.

14. The apparatus of claim 1, wherein said client includes an ADSL client.

15. The apparatus of claim 1, wherein said access event publisher is locally associated with said first local cache.

16. The apparatus of claim 1, wherein said local cache filters said at least one network access event by only accepting said at least one network access event having information containing a home access point ID that corresponds to the home access point ID of the first local cache.

17. A communications system for locally processing an access request comprising:

a first access point associated with the communications system, said first access point having a first event publisher and a first local cache, said first local cache configured for storing a user record having information corresponding to a first user; and an information bus configured for transmitting events published by at least one publisher, including said first event publisher, wherein said first event publisher publishes at least one network access event during the processing of an access request from a client.

18. The communications system of claim 17, wherein said at least one network access event includes an IP allocated event, an accounting start event, and an accounting stop event.

19. The communications system of claim 17, wherein said first local cache is responsive to said network access event by updating said user record according to information contained in said network access event.

20. The communications system of claim 19, wherein said network access event includes a network address, a home access point ID, and a user name.

21. The communications system of claim 20, wherein said network address is an IP address, said home access point ID is a home PoP ID, and said user name is a fully qualified domain name address which corresponds to a first user.

22. The communications system of claim 17, further including a mother cache coupled to said information bus, said mother cache configured for publishing at least one cache transfer event on said information bus, each of said at least one cache transfer events having at least a user record.

23. The communications system of claim 17, further including a second access point having a second event publisher and a second local cache, said second local cache configured for storing a user record having information corresponding to a second user.

24. The communications system of claim 23, wherein said second local cache is configured as a subscriber to said at least one network access event having a home access point ID that corresponds to said second access point.

25. The communications system of claim 17, further including a wide area network.

26. The communications system of claim 17, further including the Internet.

27. The communications system of claim 17, wherein said information bus is separated from a communication medium for communication using a User Datagram Protocol.

28. The communications system of claim 17, wherein said at least one network access event contains information including a home access point ID, and wherein said first local cache subscribes to said at least one network access event, and filters the network access event according to the home access point ID contained therein, only accepting the network access event having information containing a home access point ID that corresponds to the home access point ID of the first local cache.

29. The communications system of claim 23, wherein said second event publisher publishes at least one network access event on said information bus.

30. The communications system of claim 23, wherein said mother cache is configured for storing a set of user records having information corresponding to the first user and second user.

31. The communications system of claim 30, wherein said mother cache is configured as a subscriber to network access events published on said information bus.

32. A method for processing an access request submitted by a subscriber in a communications system having a mother cache and a first access point, said first access point associated with a first home access point ID and a first local cache, said method comprising:

associating the subscriber to the first access point through the first home access point ID;

loading said mother cache with at least one user record, including a user record corresponding to said subscriber; and determining, in response to a log-on attempt by said subscriber, whether the first local cache contains said user record, and obtaining said user record from the mother cache if the first local cache does not contain said user record.

33. The method of claim 32, further including:

providing a second access point associated with a second home access point ID and a second local cache; and loading said second local cache with user records containing said second home access point ID.

34. The method of claim 33, further including loading said mother cache with said user records containing said second home access point ID.

35. The method of claim 32, further including storing in said first local cache said user record obtained from said mother cache.

36. A method for locally updating a local cache associated with a network access point during the processing of an access request, said network access point corresponding to a home access point ID and said local cache containing at least one user record, said method comprising:

subscribing the local cache to at least one network access event published on a buss, said at least one network access event having a home access point ID; and updating the user record in response to a subscribed network access event if a home access point ID contained therein corresponds to the home access point ID associated with the local cache.

37. The method of claim 36, further including publishing a network access event in response to an address procured during the processing of the access request.

38. A method of processing an access request sent to an access point associated with a communications system, said access point associated with a local cache and having an access point ID, said method comprising:

listening for a network access event;

storing information corresponding to said network access event if said network access event corresponds to the local cache;

authenticating the access request;

authorizing the access request if the access request is authentic; and procuring an address and publishing an IP allocated event, if the access request is authorized.

39. The method of claim 38, further including:

accounting for the utilization of said address; and publishing an accounting start event if an accounting start signal is received.

40. The method of claim 38, further including:

accounting for the utilization of said address; and publishing an accounting stop event if an accounting stop signal is received.

* * * * *

UNITED STATES PATENT AND TRADEMARK OFFICE
CERTIFICATE OF CORRECTION

PATENT NO.     : 6,263,369 B1
DATED          : July 17, 2001
INVENTOR(S)    : Sitaraman et al.

It is certified that error appears in the above-identified patent and that said Letters Patent is hereby corrected as shown below:

Column 13,
Line 28, replace "buss" with -- bus --.

Column 2,
Line 61, after "diagram of" delete "a".

Column 8,
Line 19, after "as" insert -- a --.

Column 9,
Line 30, after "case" insert -- where --.
Line 32, after "be" delete "so".

Column 10,
Line 18, replace "tha" with -- that --.
Line 18, after "corresponds" delete ",".

Signed and Sealed this

Second Day of April, 2002

JAMES E. ROGAN
*Director of the United States Patent and Trademark Office*

*Attest:*

*Attesting Officer*